No. 671,261.  
Patented Apr. 2, 1901.

D. BRIGGS & W. H. SHEPARD.
TYPE WRITING MACHINE.
(Application filed Apr. 18, 1898.)

(No Model.)  
5 Sheets—Sheet 2.

WITNESSES:  
H. W. Lloyd  
C. E. Ashley

INVENTORS:  
Daniel Briggs and Wm. H. Shepard  
By their Attorney.  
Jacob Felbel

THE NORRIS PETERS CO., PHOTO-LITHO., WASHINGTON, D. C.

No. 671,261. Patented Apr. 2, 1901.
D. BRIGGS & W. H. SHEPARD.
TYPE WRITING MACHINE.
(Application filed Apr. 18, 1898.)
(No Model.) 5 Sheets—Sheet 3.

No. 671,261. Patented Apr. 2, 1901.
D. BRIGGS & W. H. SHEPARD.
TYPE WRITING MACHINE.
(Application filed Apr. 18, 1898.)
(No Model.) 5 Sheets—Sheet 4.

WITNESSES:
H. W. Lloyd
C. E. Ashley

INVENTORS:
Daniel Briggs & W. H. Shepard
By their Attorney,
Jacob Felbel

No. 671,261. Patented Apr. 2, 1901.
D. BRIGGS & W. H. SHEPARD.
TYPE WRITING MACHINE.
(Application filed Apr. 18, 1898.)

(No Model.) 5 Sheets—Sheet 5.

WITNESSES:
H. W. Lloyd.
C. E. Ashley.

INVENTORS:
Dan'l Briggs & Wm H. Shepard.
By their Attorney.
Jacob Felbel

UNITED STATES PATENT OFFICE.

DANIEL BRIGGS AND WILLIAM H. SHEPARD, OF BROOKLYN, NEW YORK, ASSIGNORS TO WYCKOFF, SEAMANS & BENEDICT, OF ILION, NEW YORK.

TYPE-WRITING MACHINE.

SPECIFICATION forming part of Letters Patent No. 671,261, dated April 2, 1901.

Application filed April 18, 1898. Serial No. 677,941. (No model.)

*To all whom it may concern:*

Be it known that we, DANIEL BRIGGS and WILLIAM H. SHEPARD, citizens of the United States, and residents of the borough of Brooklyn, county of Kings, and city and State of New York, have invented certain new and useful Improvements in Type-Writing Machines, of which the following is a specification.

The present invention relates to type-writing machines wherein a carriage is fed forward in a step-by-step manner by means of a motor-spring and an escapement controlling the forward motion of the carriage. In the prior art numerous forms or types of escapement mechanisms are disclosed, to most or all of which the present invention or certain parts thereof are readily applicable, and hence while we have elected to show our improvements in connection with only one general form or type of escapement mechanism it will be understood that we do not wish to have all of our claims limited specifically thereto.

A common form of escapement for typewriting machines includes a vibratory bar carrying a fixed dog at the rear, which has a flat working face, and a spacing-dog at the front, which is movable parallel to the plane of the rack (straight or circular) when released from the same in order to come opposite the space between the tooth it has just left and the succeeding tooth. In this construction if the fixed dog is allowed to enter a space of the rack to a depth sufficient to insure that the carriage shall be held properly the carriage is held stationary for an undue length of time after the impact of the type upon the platen and while the type is returning and the dog is moving back clear of the tooth with which it is engaged. This makes the machine relatively slow, for the carriage cannot move to give a letter-space until the fixed dog has released the rack, and the longer it takes the holding-dog to release the rack the slower the action of the feed. Another defect of this construction is that it sometimes happens that the spacing-dog is thrown so far in a direction parallel to the rack that it interferes with a tooth of the rack when the key is released and the dog moves back to engage with the rack and causes the escapement and the carriage to "stick" and stop or is thrown too far in a direction parallel to the rack and skips a tooth thereof, thus causing improper spacing. Efforts have been made to overcome the first of these difficulties by means of a bevel on the fixed dog, so as to allow the carriage to begin its motion before it is wholly released from the control of the fixed dog. There is a difficulty, however, connected with this construction, which is that the camming action of the said bevel with a rack-tooth tends to vibrate the rocker-bar carrying the dog and sometimes allows the carriage to skip one or more spaces and unduly separate the letters of a word or the like. This defect shows itself more particularly when there is a light returning spring tension on the rocker-bar. Another defect connected with the beveled-fixed-dog arrangement is the liability that the rack-tooth, instead of catching upon that part or face of the dog which is parallel to the face of the rack-tooth, may strike the bevel on the dog. In such case the spacing-rocker may under the momentum of the carriage and the rack escape by the dog even while the key is being depressed, thus causing the machine to skip. This defect shows itself more particularly where the depression of the key is weakly or hesitatingly done. Also in this case when the rack-tooth lands on the bevel instead of on the straight face of the dog there is an undue resistance offered to the touch. This resistance is objectionable in itself and also in its occasional consequence of a failure to print when a light finger-stroke is used, the power being absorbed by the said resistance before the type can reach the platen, or if sufficient force be applied to cause printing there is a camming action between the tooth of the rack and the beveled dog, tending to force the carriage backward, which is objectionable, making the touch too heavy.

The objects of our invention are to avoid as far as possible each and all of the foregoing objections and also to provide a novel and efficient escapement mechanism.

To these ends we provide in the preferred form of our invention an escapement mechanism including a rack, (as a straight or segmental toothed bar or a ratchet-wheel,) a reciprocating arm or dog-carrier, to which is pivoted a spring-pressed holding-dog movable only in the direction of motion of the carrier, this dog being provided with a rack-tooth stop (one or more) arranged in step-like order relatively to the working face of the dog and adapted to coact with the teeth of the rack and stop the same, and a spring-pressed feed-dog also pivoted to said carrier to move in the direction of motion thereof and having its working face so set relatively to the working face of the holding-dog as to allow a slight forward motion or "drop" of the rack-teeth in passing from the working face of the feed-dog to the working face of the holding-dog. A suitable stop between the dogs serves to keep them at the desired distance from each other.

The foregoing or preferred form of our invention attains all the objects thereof; but we may omit or vary one or more features of our invention in order to attain in greater or less degree one or more of the objects sought.

Our invention includes, broadly, a rack, (as a straight or segmental rack-bar or a ratchet-wheel,) a holding-dog which is normally out of engagement with the rack and with which the rack-teeth in the rapid operation of the devices normally coact to hold the carriage during the printing movement of the type, and a rack-tooth stop, with which the teeth of the rack may coact, as on escaping from said dog during a slow return of the parts to normal positions, or with which the rack-teeth coact on failure of the normal working face of the said dog to move far enough over and catch and hold the rack, as may occur when a key is slowly depressed, relatively speaking, thus insuring the stoppage of the carriage-feed.

Our invention further consists in other combinations of devices and features of construction hereinafter described, and more particularly pointed out in the appended claims.

The preferred form and several modifications of our invention are shown in the accompanying drawings, forming part of this specification, in which—

Fig. 8 is a perspective view of a modified form of the holding-dog, showing one rack-tooth stop. Fig. 9 is a similar view of a holding-dog, showing five rack-tooth stops. Fig. 10 is a plan view of a third modification, in which a holding-dog movable independently on its carrier is combined with a rack-tooth stop fast on or forming part of the carrier. Fig. 11 is a rear view of the modification shown in Fig. 10 and showing also a ratchet-wheel. Fig. 11$^a$ is a perspective view of the modification shown in Figs. 10 and 11. Fig. 12 is a perspective view showing a fourth modification of our invention, in which the curved or circular rack is replaced by a straight rack, the dogs being similar to those shown in Fig. 1. Fig. 15$^a$ is a perspective view of the modification shown in Figs. 13, 14, and 15. Fig. 22 is a perspective view of the modification illustrated at Figs. 19, 20, and 21.

In the various views the same part will be found designated by the same numeral of reference.

Figure 1:
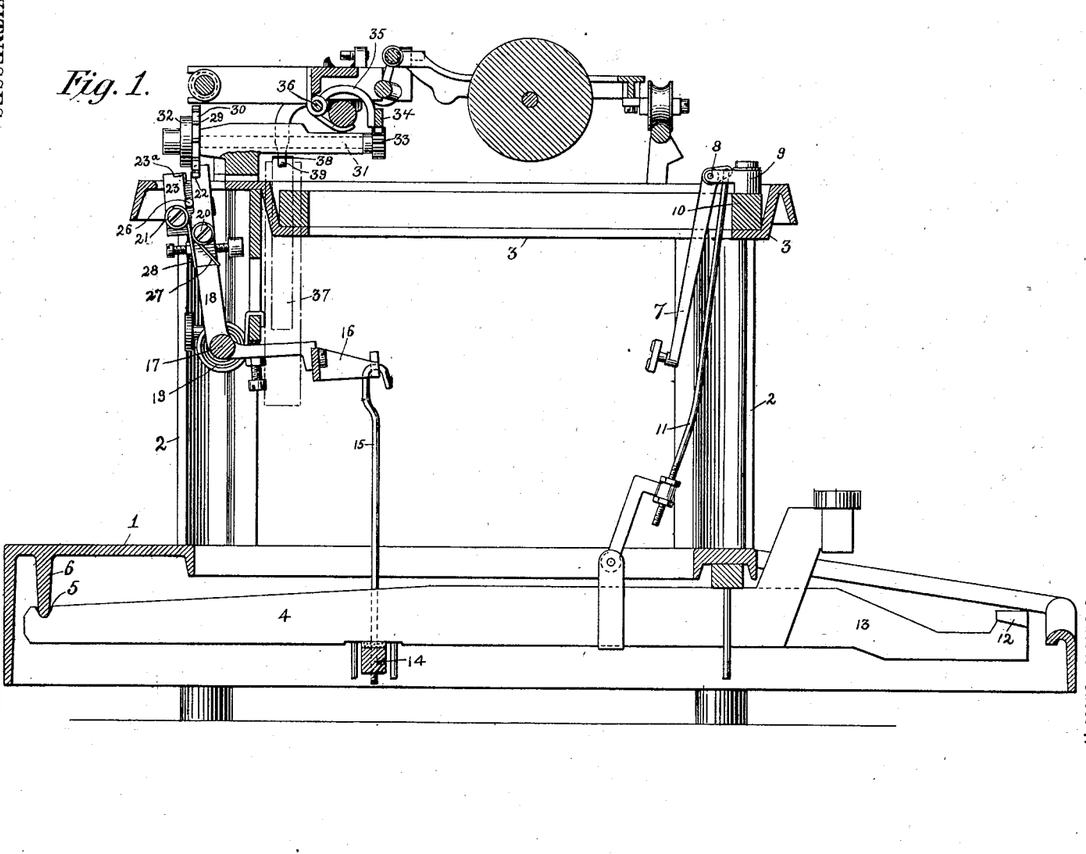
Figure 1 is a central vertical sectional view from front to rear of a well-known form of type-writing machine, (Remington No. 6 type-writing machine,) showing the preferred form of our escapement and connections by which it controls the carriage.
Figure 2:
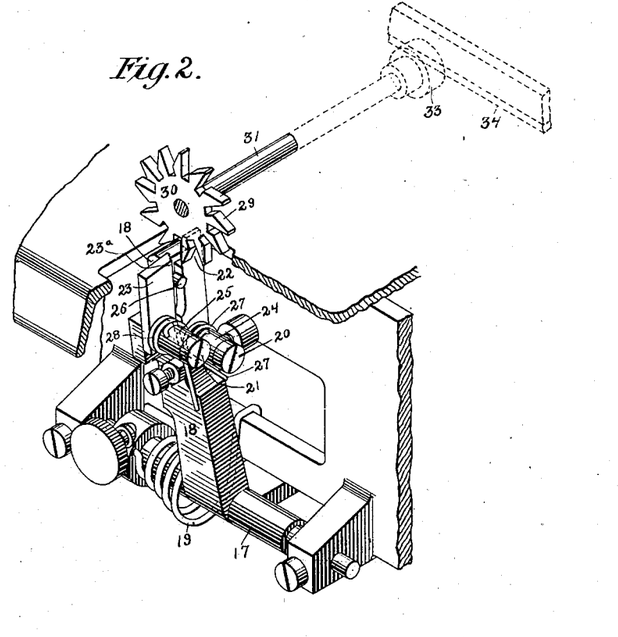
Fig. 2 is a perspective view of the same form from the rear, showing more particularly the vibratory or rocker bar, the feed and holding dogs, and the ratchet-wheel.

Referring more particularly to Figs. 1 to 7, inclusive, the reference-numeral 1 indicates a base-frame; 2, uprights or standards secured to or cast with said base-frame; 3, a ring or top plate secured to the standards 2, the whole forming a rigid framework similar to that found in a well-known form of type-writing machine. 4 represents the key-levers, provided near their rear ends with notches 5 in their upper edges to fit under and against a rib 6, projecting downwardly from the top of the base-frame 1. 7 indicates a type-bar which is pivoted at 8 in a hanger 9, secured to the top ring 10. 11 marks a connecting-rod pivotally attached at its ends to the type-bar 7 and to the key-lever 4. The space-bar 12 is carried by the usual levers 13. The universal bar 14 is connected by means of links 15 with arms 16, projecting forwardly from a rocker 17, journaled at the rear of the machine and provided with an arm or dog-carrier 18, projecting upwardly therefrom, and with a returning-spring 19. The foregoing devices are or may be of any usual or suitable construction. In this form of mechanism we attach two pivots 20 and 21 to the bar 18 at suitable distances from the top thereof to form the axis of motion of the feed-dog 22 and holding-dog 23. The pivots 20 and 21 (shown in Figs. 1, 2, and 3 of the drawings) are parallel with the axis of the rocker 17, and each is formed of a slotted head, a cylindrical portion, and a reduced screw-threaded end, which engages with a suitable screw-threaded hole or perforation in the arm 18. The feed and holding dogs 22 and 23 are respectively provided with sleeves 24 and 25, which fit between the heads of the pivots 20 and 21 and the vertical face of the bar or rocker 18. Between the dogs 22 and 23 the bar 18 is provided with a pin or stop 26, against which the said dogs are pressed by their respective springs 27 and 28. The spring 27 has one end secured to the sleeve 24, (as by insertion in a hole therein,) is loosely coiled about the said sleeve, and its other end is caught against a shoulder of the arm 18. (See Fig. 2.) The spring 28 has one end similarly attached to the sleeve 25, is loosely coiled about said sleeve, and has its other end caught against a part of the arm 18. The feed-dog 22 is normally in engagement with a tooth 29 of the ratchet-wheel 30, which may be either loose or fast upon the shaft 31—that is to say, the shaft 31 and the wheel 30 may be connected loosely in the usual manner by a backing-ratchet inclosed in a casing 32, or the wheel may be pinned fast to said shaft. The shaft 31 is suitably journaled in the framework of the machine and is provided with a pinion 33, fast thereon, which meshes with a rack 34, borne by arms 35, pivoted at 36 to the carriage. The carriage is moved by the usual spring-drum 37 and strap 38, connected at 39 to the carriage. The relative arrangement of the parts is such that the power of the spring-drum through the carriage, the rack, the pinion, and shaft tends normally to hold a tooth 29 of the ratchet-wheel 30 against the working face of the feed-dog 22, as shown in Fig. 2.

The front or working face of the feed-dog 22 is flat and parallel with and in contact with the face of the engaging tooth 29 of the wheel 30 in the normal positions of the parts. The dog 22 is beveled on its back, as at 40, to facilitate the escape of the rack-teeth by the dog during the operation of the machine.

The holding-dog 23 is provided with a flat working face 23ª, with which the teeth 29 of the ratchet-wheel 30 engage, and with two shoulders or rack-tooth stops 41 and 42, parallel to face 23ª and arranged in step-like order relatively thereto and adapted each to coact with the teeth 29 of the ratchet-wheel 30 to stop and hold the same. By reference to Fig. 5 it will be seen that if planes parallel to the plane of motion of the wheel 30 be drawn through the end or point 43 of the stop 42 and the point 44 of the feeding-dog the perpendicular distance between these planes (indicated by the dotted lines $a$ and $b$) is less than the thickness of the ratchet-wheel 30 or the width of a tooth 29. It will also be observed in said figure that the working face of the feeding-dog 22 is set out of or is not in the plane of the working face of the dog 23, so that in the normal operation of the machine the teeth 29 move slightly forward or drop in passing to the working face 23ª of the holding-dog 23. (See Fig. 6.) The working parts of the machine are so timed that the impact of the type occurs practically at the moment the carriage is stopped by the dog 23 itself catching a tooth 29 or the stoppage of said tooth by one or the other of said stops 41 and 42.

The operations of the described devices under various conditions will now be explained.

Figure 4:
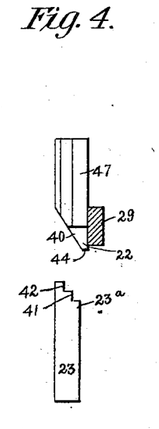
Figs. 4, 5, 6, and 7 are diagrammatic plan views illustrating the operation of our preferred form of escapement.
Figure 5:
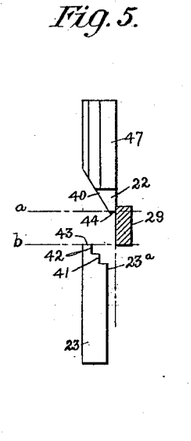
Figure 6:
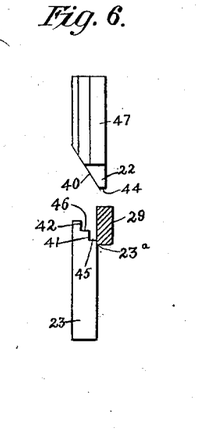
Figure 7:
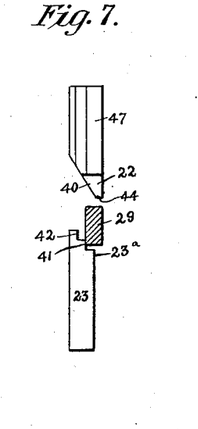

Assuming a quick smart stroke upon a finger-key, the carrier 18 is thrown quickly and the dogs 22 and 23 are moved from the positions shown in Figs. 1, 2, and 4 to the position shown in Fig. 6. Fig. 4 indicates diagrammatically the normal positions of the dogs and the rack-tooth before a key is struck. Fig. 5 indicates a position of the said parts intermediate the positions thereof shown in Figs. 4 and 6, in which the rack-tooth 29 is about to drop from the dog 22. In the case assumed this drop is from the feeding-dog to the working face 23ª of dog 23, as in Fig. 6. On the release of the key the parts are returned to their normal positions by the described spring 19. With the parts in the positions shown in Fig. 6 the following action occurs on the smart or quick return of the parts to normal positions. The tooth 29 in engagement with the face 23ª may escape through the opening between the dogs without being caught by the stops; but the edge or point 44 of the dog 22 will come in contact with the forward side or edge of the tooth 29, whereupon the dog 22 will turn on its pivot, while the bar 18 continues its rearward motion. The very slight friction between point 44 and the tooth 29 does not impede the motion of the wheel 30, and the dog 22 under the action of its spring 27 moves back into normal position relatively to the bar 18 as soon as it is freed from tooth 29 and simultaneously engages the succeeding tooth 29 on the wheel 30, thereby arresting the feed-motion. Assuming the parts to be in the position shown in Fig. 6 and the rocker-returning spring to be weak or of low tension, on account of a hesitating release of the key by the operator, the parts will not return to normal positions in the manner just above described, but in the following manner: On the slow upstroke of the key the tooth 29 will slide off the working face 23ª of the holding-dog 23 and drop onto either the stop 41 or 42, according to the speed with which the parts are returning to normal position. Under the slowest speed the tooth 29 will drop onto the first stop 41; but under a quicker speed, less, however, than the first above described, the tooth 29 will pass the stop 41 and land on or strike against the stop 42 before escaping from the holding-dog. If the tooth 29 should land on stop 41, as in Fig. 7, it will escape thereafter as the key continues to ascend, either directly without touching stop 42 or after landing on or touching said stop 42, according to the speed of the parts. If the tooth 29 has landed on either of the stops 41 or 42, it does not pass out of engagement therewith subsequently without touching the feed-dog 22. The point 44 or inner top edge of the feed-dog 22 in every instance or under all the various conditions of operation strikes against the front side of the rack-tooth 29 on the return movement of the rocker and while such tooth is escaping, and said feeding-dog is then turned on its pivot against the pressure of its spring while the tooth is passing and the rocker is continuing its movement. As soon as the said tooth has passed by the feeding-dog the spring of the latter acts to snap it into the next tooth-space, and thus arrest the movement of the rack and of the carriage. This action takes place always whether the rocker or carrier returns quickly or slowly, because at some place the tooth-escape opening or passage-way is of less width than the width of the rack-tooth or rack, and hence the feeding-dog must yield to allow the tooth to pass out. It results from this that the feed-dog presses against the side of the passing tooth and engages the next space instantly it comes opposite said dog. Thus the feeding-dog can never skip a notch or tooth of the rack or wheel.

The above explains the action of the parts when the key has been rapidly depressed and also the action of the parts both when the dogs return rapidly and when they return slowly.

We will now describe the action of the parts when the key is depressed slowly or when struck with a legato blow. In this case the rack-tooth 29 will after escaping from dog 22 land directly either upon the stop 41 or the stop 42 without contacting with the working face 23ᵃ of the holding-dog 23. Under a moderately slow downstroke of a key 4 the rack-tooth will contact with the stop 41 and the carriage will be arrested and the type impression made; but on a still slower downstroke of the key the rack-tooth will skip stop 41 and directly contact with the stop 42 and the carriage will be arrested and the type impression made, as before. It will be observed that the sliding contact of teeth 29 on stops 41 and 42 is a non-wedging or non-camming action, similar to the contact between the said teeth and the flat holding-dog. In no case of a slow depression of a key, however, can the rack-tooth 29 escape without striking one or the other of the stops 41 and 42, and thereby causing the carriage to be arrested. If the rack-tooth 29 should land on the first stop 41 or on the second stop 42 and the depression of the key be thereafter continued, the dog carrier or rocker will not be arrested, but will continue its forward vibratory movement independently of the holding-dog 23, which will remain relatively stationary against the rack-tooth 29 while this continued motion of the key and rocker takes place, this operation being permitted by reason of the pivotal connection of the holding-dog with its rocker or carrier. On the return movement of the rocker the independent spring 28 of the dog 23 causes it to automatically resume its normal position relatively to said rocker. Thus the stoppage of the holding-dog 23 before the rocker has made its full forward movement will not in turn interfere with the further and complete depression of the key, and for this reason the finger of the operator will not suddenly encounter a materially-increased resistance, which would render the "touch" objectionable. Upon the release of the finger-key the escape of the rack-tooth 29 will take place, as above described, except that it starts from the stop on which it had landed and not from the working face 23ᵃ. After a rack-tooth 29 has once left the working face of the feed-dog 22 and been arrested by the working face 23ᵃ of the holding-dog, such tooth cannot return directly to the working face of the feed-dog 22 on account of the drop afforded said tooth.

By mounting the holding-dog upon its carrier so that it may move relatively thereto in a plane at right angles to the plane of the rack and providing it with a light returning-spring we secure that the touch shall remain substantially even or uniform, even when a rack-tooth fails to fall upon the normal working face of the dog 23, for the rack-tooth stop will catch the rack-tooth and the dog will readily yield to allow full motion of the carrier and key. By providing more than one rack-tooth stop and placing the same upon the aforesaid pivoted holding-dog we secure the desired results and provide a mechanism adapted to all classes of operators.

The dog 22 is provided with an extension 47 at its upper end, and the wheel 30 is provided with notches 48 at the bottoms of the spaces between the pointed teeth 29, said notches 48 having parallel sides substantially. The extension 47, coacting with the sides of notches 48, acts as a detent to hold the escapement-wheel in a substantially fixed position when the operator disengages the rack 34 from the pinion 33 in the manner common to this class of machines, since the stop 47 cannot swing in the plane of the wheel 30, thus avoiding the usual extra mechanism used for the same purpose.

Figure 3:
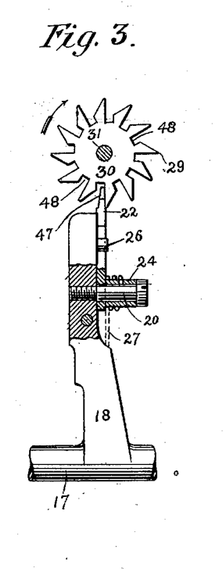
Fig. 3 is a rear view of the same form, showing the rocker-bar partly broken away, the feed-dog, and the ratchet-wheel.

At Fig. 3 the arrow shows the direction of rotation of the escapement-wheel during printing. When the rack 34 is raised from its pinion 33, the escapement-wheel is relieved of the pressure from the mainspring and has a tendency to turn slightly in the opposite direction and could turn back nearly a tooth-space but for the presence of the detent 47 in engagement with the square notch of the escapement-wheel. Thus the escapement-wheel is held by the detent 47 in a substantially fixed position when the rack and pinion are disengaged. The purpose of holding the escapement-wheel stationary, or substantially so, is to prevent the pinion 33 from turning or being jarred around far enough to lose its proper register with the rack 34 upon a reëngagement of the rack and pinion, and thus disturbing or changing the regularity of the margin at the left-hand side of the paper. By holding the escapement-wheel in the manner shown and described the pinion cannot turn enough to lose its proper relationship to the rack.

Figures 8, 9, 10, 11, 11A, 12, 15A, 22:
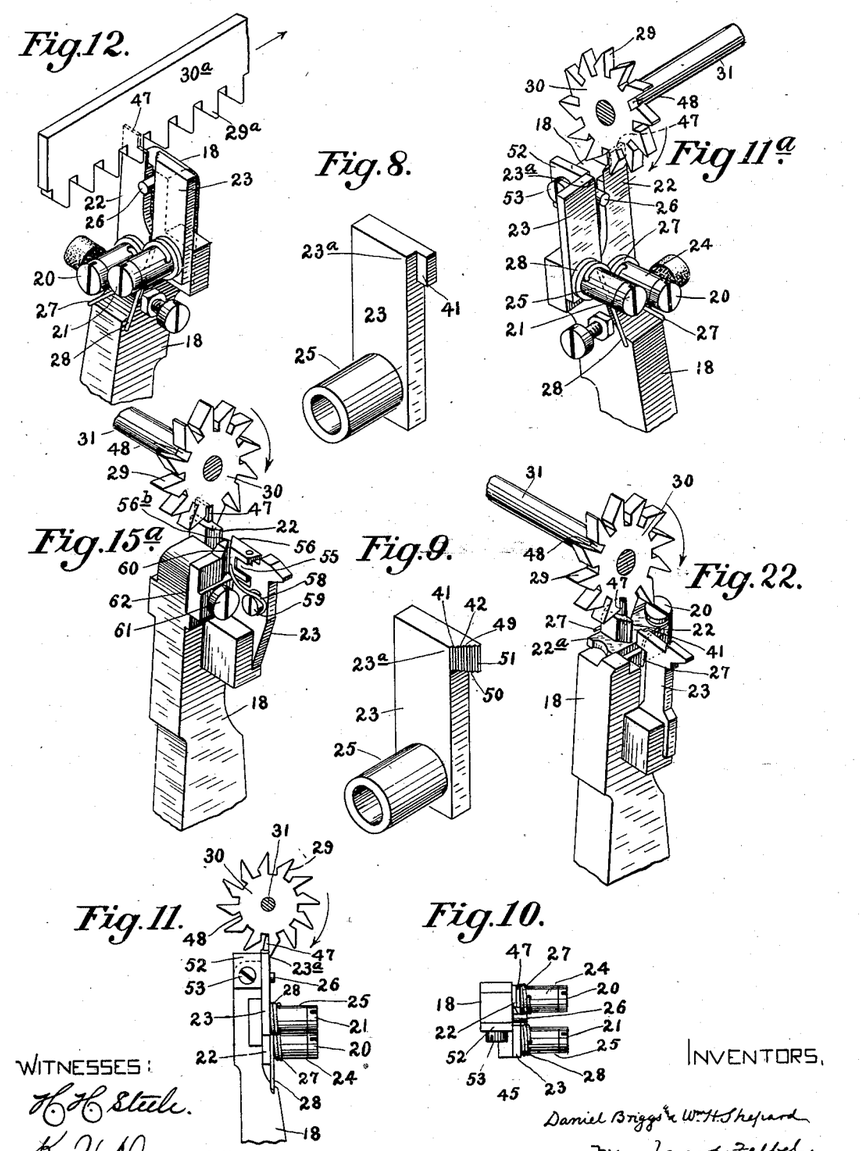
Figures 13, 14:
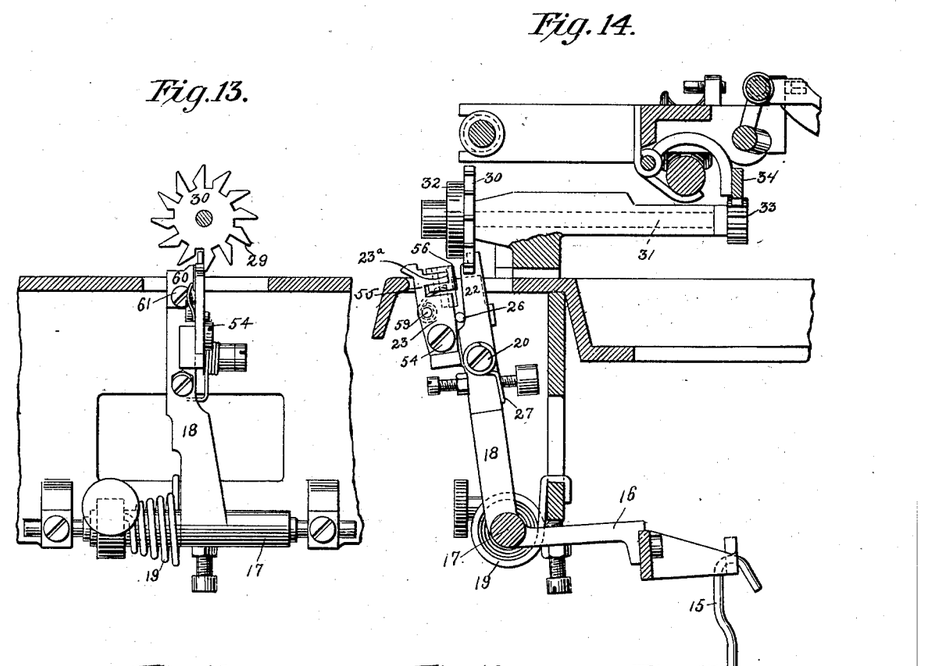
Fig. 13 is a rear view of a fifth modification of our invention, embodying an independently-pivoted rack-tooth stop.
Fig. 14 is a sectional side elevation of the modification shown in Fig. 13.
Figure 15:
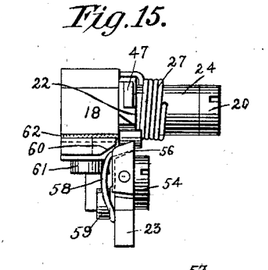
Fig. 15 is a plan view of the modification shown in Figs. 13 and 14.

The modified form of the holding-dog 23 shown in Fig. 8 has but one rack-tooth stop, as the lug or projection 41, which is "stepped" or ledge-like as regards the face 23ᵃ of the holding-dog. In other respects it is or may be substantially the same as the form of the holding-dog shown in Figs. 1 and 2.

The modified form of the holding-dog 23 shown in Fig. 9 is provided with five rack-tooth stops 41 42 49 50 51, the said stops being parallel to the working face 23ᵃ of the dog 23 and being arranged in a step-like order relatively thereto. In operation the rack-tooth may land on any of said stops.

In the modification illustrated in Figs. 10 and 11 the feed-dog 22 and its parts are or may be similar to the same parts shown in Figs. 1 and 2 and above described. The spring-pressed pivoted holding-dog 23 in this instance is not provided with an integral rack-tooth stop, but the bar 18 is provided with such a rack-tooth stop 52, which overlies or projects inward beyond or is stepped relatively to the working face of the dog 23 in the manner of the rack-tooth stops hereinbefore described. The operation of this modification is substantially similar to that form of the invention shown in Figs. 1 and 2, the main difference in construction being that the stop 52 is fast on the bar 18 instead of on the independently-pivoted dog 23. While the stop 52 is shown as a separate piece of metal attached to the bar 18 by a screw 53, it is obvious that it could be formed integrally with the bar, and there may be two or more rack-tooth stops on the bar 18 in place of the stop or step 52.

In the modification illustrated in Fig. 12 the circular rack 30 is replaced by a straight rack 30ᵃ, while the remaining parts shown are or may be substantially the same as those hereinbefore described, more particularly in connection with Figs. 1 and 2. It will be noted that the end of the bar 18 does not in Fig. 12 project sufficiently far to coact with the rack-teeth 29ᵃ.

Figure 16:
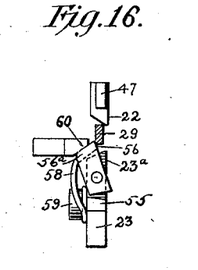
Figs. 16 and 17 are diagrammatic plan views illustrating the operation of the last-named modification.
Figure 17:
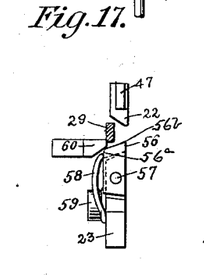
Figure 18:
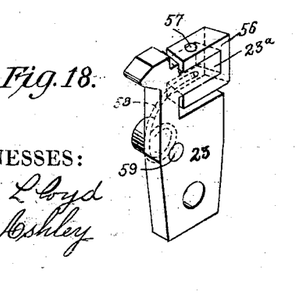
Fig. 18 is a perspective view, on an enlarged scale, of the holding-dog and stop shown in Figs. 13, 14, 15, 16, and 17.

Referring to the modifications illustrated in Figs. 13 to 18, inclusive, the parts of the machine similar to or like those hereinbefore described are marked with the same numerals of reference and require no further description. The feed-dog 22 is or may be similar to that hereinbefore described and may be similarly mounted. The holding-dog 23 is rigidly secured to the arm 18, as by a screw 54, passing through a perforation in the dog and engaging with a screw-threaded hole in the arm. The dog 23 is constructed to provide a raised forwardly-projecting tongue-like piece 55, one side 23ᵃ of which constitutes the working face of the dog. A rack-tooth stop 56, shaped somewhat like the letter U, is attached pivotally at 57 to the tongue 55 to embrace the same and to lie with its working surface normally in the plane of face 23ᵃ. (See Figs. 15, 17, and 18.) The dog 23 is provided with a spring 58, secured at one end to the dog by means of a screw 59, which spring presses the pivoted stop 56 to the right in Figs. 13 to 18. The front or free end of the tongue 55 is beveled, as shown in Fig. 16, to form a stop, against which the spring 58 presses the inside beveled surface 56ᵃ, Fig. 17, of stop 56. The bar 18 is provided with a fixed beveled stop 60, which coacts with an exterior bevel 56ᵇ on the stop 56, as shown in Fig. 16, to limit the motion thereof. The stop 60 is shown as an independent piece of metal, adjustably attached to the arm 18 by means of a screw 61, which passes through a suitable opening or slot (not shown) in the stop. Adjustment may be effected by loosening the screw 61, turning or pivoting the stop 60 to the desired position, and tightening up the screw 61. A liner 62, of fabric or other material, is or may be interposed between the stop 60 and the arm 18. The diagrammatic Figs. 16 and 17 illustrate the operation of this modification. In the normal operation of the machine the dog 22 moves from the rack-tooth 29 and the latter drops to the face 23ᵃ of the holding-dog 23 on the depression of a key. When the key is released, the dog 23 slides from the tooth 29 and the latter contacts with the movable stop 56, pushes it back against stop 60, as shown in Fig. 16, and escapes by the point of stop 56, as shown in Fig. 17; but it may also be checked or stopped by the end of the stop 60, and subsequently escape therefrom and allow the next tooth 29 of the rack to be stopped by the feed-dog 22. In case a key is slowly depressed, the tooth 29 may strike upon the pivoted stop 56 and move it backwardly against stop 60, and thus fail to coact with the face 23ᵃ. In such case the "give" of the key-levers 4 will suffice to permit of the full printing movement of the type-bar, and the carriage will be fed forward the space of one tooth of the rack 30.

Figure 19:
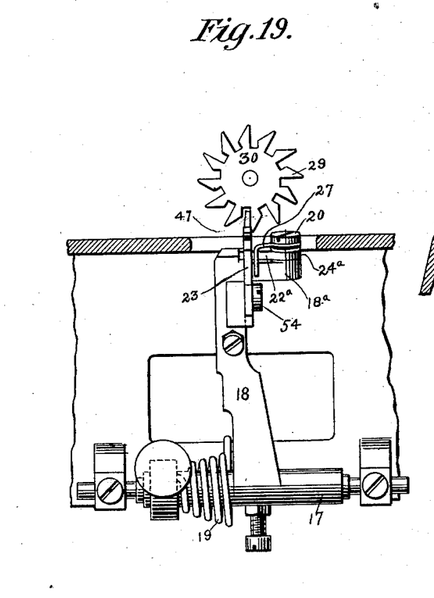
Fig. 19 is a rear view of a sixth modification of our invention, wherein the feed-dog is pivoted upon an axis at right angles to the axis of the vibratory bar and the holding-dog is fixed on the bar and carries a fixed rack-tooth stop.
Figure 20:
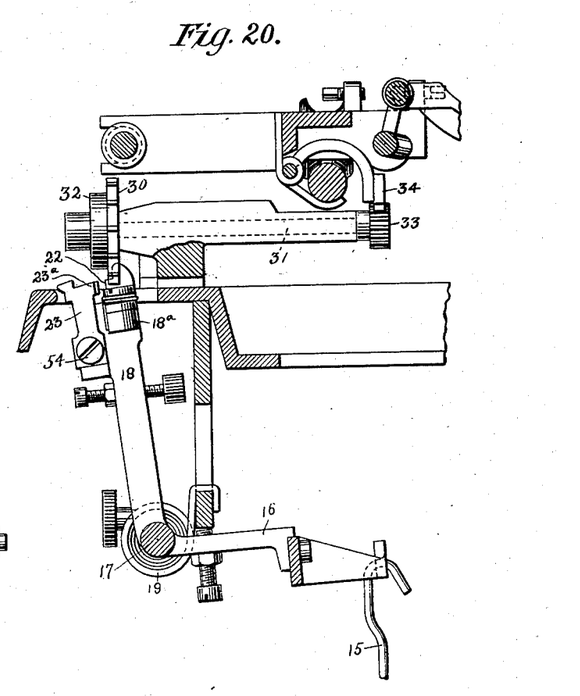
Fig. 20 is a side elevation, partly in section, of the modification shown in Fig. 19.
Figure 21:
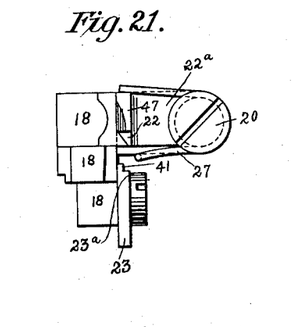
Fig. 21 is a plan view, on an enlarged scale, of the dogs shown in Figs. 19 and 20.

The modification of the invention illustrated in Figs. 19, 20, and 21 will now be described. Those parts of the machine marked with the same numerals of reference as in the previous figures are the same, substantially, as hereinbefore described and have the same functions. In this modification the holding-dog 23 is rigidly attached to the arm 18, as by a screw 54, and is provided with a rack-tooth stop 41, being in this respect similar to the modification illustrated in Fig. 8. The feeding-dog in this modification comprises a right-angled piece of metal, the part 22 thereof which coacts with the rack-teeth standing vertically, while the horizontal portion 22ᵃ is pivoted on a vertical axis or screw 20, passing through an eye 24ᵃ on the portion 22ᵃ and engaging with a screw-threaded hole in the branch 18ᵃ of the arm 18. The spring 27 presses the dog 22 toward the dog 23. The dog 22 is beveled upon its back, as in the preceding cases. The operation of the modification shown in Figs. 19 to 21 is substantially the same as that of the form of the invention illustrated in Figs. 1, 2, and 3, excepting that the holding-dog 23 has a single step or stop 41 and has no motion in the direction of motion in the bar 18 independently of the bar itself.

We have illustrated and described herein several modifications or forms of our invention mainly to indicate its generic nature. That species shown in Figs. 13 to 17 forms the subject-matter of a divisional application filed by us December 1, 1898, Serial No. 697,948, and is specifically claimed therein.

It is to be understood that we do not limit our claims to the particular type of carriage feed or escapement mechanism shown in the drawings and hereinbefore described, for, as indicated hereinbefore, there are many types of escapement mechanisms and our improvements in whole and in part may be embodied therein.

As far as some of the broader features of our invention are concerned any form or detail construction of holding-dog and feeding-dog may be employed, for it is apparent that the rack-tooth stop or stops may be used with a great variety of holding and feeding dogs constructed and arranged differently from those herein shown.

We have for convenience called the dog 22 the "feeding-dog" and the dog 23 the "holding-dog," because the latter acts to hold the carriage when the type is about to make its impact and the former coacts with the rack to enable the carriage to feed its letter-space distance after the impression.

Preferably in all forms of our invention the distance apart of the working faces of the feeding-dog and the holding-dog and the width of the teeth of the feed-rack and the throw of the dog rocker or carrier are so related as that in normal action when the dogs are vibrated and the feeding-dog is disengaged from the rack-tooth the latter is instantly engaged by the working face of the holding-dog and at a point near its extreme end, so that almost instantly the pressure upon the finger-key is released the holding-dog will part company with the rack-tooth and the latter will start to make its escapement, and simultaneously therewith the carriage will of course begin its feed movement. This quick escape of the rack-tooth likewise occurs whenever the rack-tooth stop has arrested the rack-tooth and is subsequently permitted to move away from said tooth by the release of the pressure on the finger-key. Thus the mechanism is constructed to operate fully or substantially as quickly after the type impression as the other prior constructions of this class, while at the same time means are provided for insuring against "skipping" and for remedying other well-known defects of such prior constructions.

It will be observed that the rack-tooth stops in all instances shown are stepped relatively to the working face of the holding-dog and that in some cases there is but one step and in others a plurality of steps. In the use of the term "stepped" in the claims we desire to be understood to include both a single step and a series of steps.

The rack-tooth stops are abrupt or stepped-like and of such character or arrangement as that when a rack-tooth has come into engagement with any one of such steps it is impossible to cam or wedge back the rack-teeth to or upon the working face of the holding-dog and to move back the carriage connected with the rack.

What we claim as new, and desire to secure by Letters Patent, is—

1. In a type-writing machine and in an escapement mechanism, the combination of a rack, a holding-dog and a non-wedging stop to engage the working faces of the teeth of said rack when the relative motion (at right angles to the plane of the rack) of the rack and said dog is not sufficient to cause engagement between a rack-tooth and said dog, substantially as described.

2. In a type-writing machine and in an escapement mechanism, the combination of a rack, a holding-dog, and a non-wedging rack-tooth stop carried by said dog and adapted to engage the working face of a tooth of said rack when the relative motion (at right angles to the plane of the rack) of the rack and dog is not sufficient to cause engagement between a rack-tooth and said dog, substantially as described.

3. In a type-writing machine and in an escapement mechanism, the combination of a rack, a holding-dog, a feed-dog normally in engagement with the rack, and a non-wedging stop to engage the working faces of the teeth of said rack, substantially as described.

4. In a type-writing machine and in an escapement mechanism, the combination of a rack, a holding-dog, a non-wedging rack-tooth stop carried by said dog, and a feed-dog normally in engagement with said rack, substantially as described.

5. In a type-writing machine and in an escapement mechanism, the combination of a rack, a holding-dog, and a stepped rack-tooth stop, substantially as described.

6. In a type-writing machine and in an escapement mechanism, the combination of a rack, a holding-dog, and a stepped rack-tooth stop rigid with said dog, substantially as described.

7. In a type-writing machine and in an escapement mechanism, the combination of a rack, a holding-dog, a feed-dog normally in engagement with the rack, and a stepped rack-tooth stop, substantially as described.

8. In a type-writing machine and in an escapement mechanism, the combination of a rack, a holding-dog, a stepped rack-tooth stop rigid with said dog, and a feed-dog normally in engagement with said rack, substantially as described.

9. In a type-writing machine and in an escapement mechanism, the combination of a rack, a spring-pressed holding-dog movable on its carrier, and a non-wedging rack-tooth stop adapted to engage the working face of a tooth of said rack when the relative motion (at right angles to the plane of the rack) of the rack and dog is not sufficient to cause engagement between a rack-tooth and said dog, substantially as described.

10. In a type-writing machine and in an escapement mechanism, the combination of a rack, a spring-pressed holding-dog movable on its carrier, and a non-wedging rack-tooth stop carried by said dog adapted to engage the working face of a tooth of said rack when the relative motion (at right angles to the plane of the rack) of the rack and dog is not sufficient to cause engagement between a rack-tooth and said dog, substantially as described.

11. In a type-writing machine and in an escapement mechanism, the combination of a rack, a spring-pressed holding-dog movable on its carrier, a feed-dog normally in engagement with the rack, and a non-wedging rack-tooth stop, substantially as described.

12. In a type-writing machine and in an escapement mechanism, the combination of a rack, a spring-pressed holding-dog movable on its carrier, a non-wedging rack-tooth stop carried by said dog, and a feed-dog normally in engagement with said rack, substantially as described.

13. In a type-writing machine and in an escapement mechanism, the combination of a rack, a holding-dog, a non-wedging rack-tooth stop, and a spring-pressed feed-dog movable on its carrier and normally in engagement with the rack, substantially as described.

14. In a type-writing machine and in an escapement mechanism, the combination of a rack, a spring-pressed holding-dog movable on its carrier, a spring-pressed feed-dog movable on its carrier and normally in engagement with said rack, and a non-wedging rack-tooth stop, substantially as described.

15. In a type-writing machine and in an escapement mechanism, the combination of a rack, a spring-pressed holding-dog movable on its carrier, a non-wedging rack-tooth stop carried by said dog, and a spring-pressed feed-dog movable on its carrier and normally in engagement with said rack, substantially as described.

16. In a type-writing machine and in an escapement mechanism, the combination of a rack, a holding-dog, a non-wedging rack-tooth stop carried by said dog, and a spring-pressed feed-dog movable on its carrier and normally in engagement with said rack, substantially as described.

17. In a type-writing machine and in an escapement mechanism, the combination of a rack, holding and feeding dogs movable on their common carrier, springs pressing said dogs toward each other, and a dog-stop on said carrier between said dogs, substantially as described.

18. In a type-writing machine and in an escapement mechanism, the combination of a rack, a spring-pressed holding-dog movable on its carrier, and a stepped rack-tooth stop, substantially as described.

19. In a type-writing machine and in an escapement mechanism, the combination of a rack, a spring-pressed holding-dog movable on its carrier, and a stepped rack-tooth stop rigid with said dog, substantially as described.

20. In a type-writing machine and in an escapement mechanism, the combination of a rack, a spring-pressed holding-dog movable on its carrier, a feed-dog normally in engagement with the rack, and a stepped rack-tooth stop, substantially as described.

21. In a type-writing machine and in an escapement mechanism, the combination of a rack, a spring-pressed holding-dog movable on its carrier, a stepped rack-tooth stop, and a feed-dog normally in engagement with said rack, substantially as described.

22. In a type-writing machine and in an escapement mechanism, the combination of a rack, a holding-dog, a stepped rack-tooth stop, and a spring-pressed feed-dog movable on its carrier and normally in engagement with said rack, substantially as described.

23. In a type-writing machine and in an escapement mechanism, the combination of a rack, a spring-pressed holding-dog movable on its carrier, and a spring-pressed feed-dog movable on its carrier and normally in engagement with said rack, and a stepped rack-tooth stop, substantially as described.

24. In a type-writing machine and in an escapement mechanism, the combination of a rack, holding and feeding dogs movable on their common carrier, said dogs being set in different parallel planes to allow the rack-tooth to "drop," springs pressing said dogs toward each other, of a dog-stop on said carrier between said dogs, substantially as described.

25. In a type-writing machine and in an escapement mechanism, the combination of a rack, a holding-dog, a feed-dog set relatively to the holding-dog to afford the rack-teeth a "drop" and normally engaging the rack, and a non-wedging rack-tooth stop, substantially as described.

26. In a type-writing machine and in an escapement mechanism, the combination of a rack, a spring-pressed holding-dog movable on its carrier, a feed-dog normally engaging the rack and set relatively to the holding-dog to afford a "drop" to the rack-teeth, and a non-wedging rack-tooth stop, substantially as described.

27. In a type-writing machine and in an escapement mechanism, the combination of a rack, a holding-dog and a non-wedging rack-tooth stop carried thereby, of a feed-dog normally engaging said rack and set relatively to the holding-dog to afford a "drop" to the rack-teeth, substantially as described.

28. In a type-writing machine and in an escapement mechanism, the combination of a rack, a spring-pressed holding-dog movable on its carrier, a non-wedging rack-tooth stop, and a spring-pressed feed-dog movable on its carrier and normally engaging said rack and set relatively to said holding-dog to afford a "drop" to the rack-teeth, substantially as described.

29. In a type-writing machine and in an escapement mechanism, the combination of a power-driven rack, a feeding-dog normally engaging the same, a holding-dog for catching and holding said rack, when the feeding-dog is disengaged therefrom, and a stepped stop for catching and holding the rack in case the normal working face of the holding-dog should fail to catch and hold said rack, substantially as described.

30. In a type-writing machine and in an escapement mechanism, the combination of a power-driven carriage, a rack connected thereto, a feeding-dog normally restraining said rack, a holding-dog, and a stop arranged adjacent thereto and at the side thereof opposite the working face of said dog and projecting inwardly beyond and parallel or substantially parallel to the said working face, so as to arrest the rack and the carriage in case the rack-tooth should fail to land on the working face of the holding-dog when the feeding-dog is disengaged from said rack, substantially as described.

31. In a type-writing machine and in an escapement mechanism, the combination of a power-driven carriage, a feed-rack connected thereto, a feeding-dog, a holding-dog, and a plurality of stops adapted to engage the teeth of the rack, substantially as described.

32. In a type-writing machine and in an escapement mechanism, the combination of a power-driven carriage, a feed-rack connected thereto, a feeding-dog having a working face parallel with its plane of movement and a beveled back, a holding-dog having a working face which is parallel with its plane of movement, and a non-wedging rack-tooth stop projecting inwardly beyond the working face of the holding-dog and toward the beveled back of the feeding-dog, substantially as described.

33. In a type-writing machine and in an escapement mechanism, the combination of a power-driven carriage, a feed-rack connected thereto, a dog-carrier, a spring-pressed feeding-dog pivoted thereon and having a working face substantially at right angles to the plane of motion of the rack and having also a beveled back, a holding-dog having a working face substantially parallel with that of the feeding-dog, and a non-wedging rack-tooth stop projecting inwardly beyond the working face of the holding-dog and toward the beveled back of the feeding-dog, substantially as described.

34. In a type-writing machine and in an escapement mechanism, the combination of a power-driven carriage, a feed-rack connected thereto, a dog-carrier, a spring-pressed feeding-dog pivoted thereon and having a working face arranged substantially at right angles to the plane of movement of the rack and having also a beveled back, a spring-pressed holding-dog pivoted to said dog-carrier and having a working face substantially parallel to that of the feeding-dog, and a non-wedging rack-tooth stop projecting inwardly beyond the working face of the holding-dog and toward the beveled back of the feeding-dog, substantially as described.

35. In a type-writing machine and in an escapement mechanism, the combination of a power-driven carriage, a feed-rack connected thereto, a dog-carrier, a feeding-dog and a holding-dog pivoted thereon, springs for pressing said dogs toward each other, means for limiting the movement of said dogs under the action of said springs, and a rack-tooth stop, substantially as described.

36. In a type-writing machine and in an escapement mechanism, the combination of a power-driven carriage, a feed-rack connected thereto, a dog-carrier, a feeding-dog thereon, and a holding-dog movably mounted on said carrier so as to travel normally in unison therewith and so as to move independently relatively thereto whereby if under a slow depression of the finger-key the rack-tooth should fail to land on the working face of the holding-dog and hence should commence to make its escape but should be encountered by some portion of said dog other than its working face the said holding-dog will operate to detain the rack-tooth and yet permit of a further movement of the dog-carrier and of a continued depression of the finger-key, substantially as described.

37. In a type-writing machine and in an escapement mechanism, the combination of a power-driven carriage, a feed-rack connected thereto, a dog-carrier, a feeding-dog thereon, and a holding-dog pivoted on said carrier and provided with a spring and with an integral rack-tooth stop whereby if a rack-tooth should fail to land on the working face of the holding-dog but should land on the rack-tooth stop, both the rack and the holding-dog will be detained in engagement while the dog-carrier is left free to continue its movement under the down force of the operating-key, substantially as described.

38. In a type-writing machine and in an escapement mechanism, the combination of a power-driven carriage, a feed-rack connected thereto, a dog-carrier, a holding-dog thereon, and a feeding-dog pivoted on said carrier to move independently thereof and in or substantially in the plane of motion of the carrier and provided with a spring; the axis of said pivot being parallel with the plane of movement of the feed-rack, and the construction and arrangement being such that upon the return of the dog-carrier after the release of the finger-key and during the escape movement of the rack-tooth from the holding-dog, if the feeding-dog should strike the escaping rack-tooth it will yield or vibrate on its pivot and permit the dog-carrier and the finger-key to return to normal position without arresting the feeding movement of the rack, the feed-dog itself returning to normal position immediately upon the escape therefrom of the contacting tooth of the feed-rack and simultaneously engaging the next succeeding tooth on the feed-rack, substantially as described.

39. In a type-writing machine and in an escapement mechanism, the combination of a power-driven carriage, a feed-rack, a pinion engaging therewith, a circular feed-rack, a dog-carrier, a holding-dog thereon, and a spring-pressed feeding-dog pivoted to said carrier to vibrate independently thereon in a plane at right angles to the plane of motion of the circular feed-rack, and provided with a detent as 47 to engage the bases of the notches of the circular feed-rack, substantially as described.

40. In a type-writing machine and in an escapement mechanism, the combination of a power-driven carriage, a feed-rack connected thereto, a feeding-dog, a holding-dog arranged opposite thereto, an opening or passage-way between the extremities of the working faces of said dogs for the escape therethrough of the teeth of the feed-rack, the distance between the said extremities of the working faces of said dogs being greater than the width of the rack-teeth, and a rack-tooth stop projecting inwardly beyond the extremity of the working face of the holding-dog; the distance perpendicularly across from the extremity of said rack-tooth stop, to the plane which passes through the extremity of the working face of the feed-dog and at right angles to the plane of its movement, being less than the width of said rack-tooth, whereby the rack-tooth is necessarily arrested by the said stop in case it should fail of arrest by the working face of the holding-dog or before it reaches said stop; substantially as described.

41. In a type-writing machine and in an escapement mechanism, the combination of a power-driven carriage, a rack, any suitable holding-dog, and a feeding-dog normally engaged with the rack and mounted to move with its carrier toward and from the plane of movement of the rack and mounted on said carrier on a pivot which is parallel with the plane of movement of the rack, so as to yield or vibrate independently of said carrier in the plane of its said movement and to thereafter move independently to rack-arresting position, substantially as described.

42. In a type-writing machine and in an escapement mechanism, the combination of a power-driven carriage, a rack, any suitable holding-dog, and a pivoted spring-pressed feeding-dog normally engaged with the rack and adapted to be vibrated on its pivot in the plane of its general movement by contact with the escaping tooth of the rack, the axis of said pivot being parallel with the plane of movement of the rack, whereby the said feeding-dog is detained by said escaping tooth and caused to instantly spring into engagement with the next tooth-space on the rack when said tooth-space arrives in line with said feeding-dog, substantially as described.

43. In a type-writing machine and in an escapement mechanism, the combination of a power-driven carriage, a rack, any suitable holding-dog, a feeding-dog normally engaged with the rack and adapted to move with its carrier toward and from the plane of movement of said rack and mounted for independent movement on said carrier in the direction of reciprocation of the latter, and provided with a returning-spring, said feeding-dog being pivoted upon an axis which is parallel with the plane of movement of the rack; whereby the said independently-mounted spring-pressed feeding-dog is adapted to be moved relatively to its carrier by contact with the rack-tooth which is escaping and in a direction at right angles to the plane of the escaping tooth, so that the dog will ride on the side of the escaping tooth and snap into the next tooth-space of the rack on the completion of the escaping movement of the actuating-tooth, substantially as described.

44. In a type-writing machine and in an escapement mechanism, the combination of a power-driven carriage, a rack, a vibratory dog-carrier provided with any suitable holding-dog and with a pivoted spring-pressed feeding-dog; normally engaged with the rack and the dog-carrier being mounted to vibrate in a direction at right angles to the plane of movement of the rack, and the feeding-dog being pivoted parallel with the axis of the dog-carrier and parallel with the plane of movement of the rack, so as to have an independent movement in the direction of vibration of the rack; and the distance apart of or the passage-way between said dogs being slightly less than the width of the rack-tooth, so that during the escaping movement of a rack-tooth from the holding-dog the edge of the feeding-dog will come in contact with the adjacent side of such escaping tooth and will turn on its pivot against the tension of its spring during the continued movement of the dog-carrier and will press upon such adjacent side of the escaping tooth until such tooth has passed beyond said feeding-dog when the latter will then instantly spring or fly into the notch or space next behind such escaping tooth, substantially as described.

45. In a type-writing machine and in an escapement mechanism, the combination of a power-driven carriage, a rack, a dog-carrier adapted to reciprocate in a direction at right angles to the plane of movement of the rack, a holding-dog, and a feeding-dog, each pivoted on said carrier so as to vibrate independently thereof but solely in a plane parallel with the plane of movement of the dog-carrier, and returning-springs for said dogs, substantially as described.

46. In a type-writing machine and in an escapement mechanism, the combination of a power-driven carriage, a circular rack or ratchet-wheel, a dog-carrier mounted to vibrate at right angles to the plane of rotation of said circular rack or ratchet-wheel, and a holding-dog and a feeding-dog, both pivoted on said carrier to move independently of the latter but solely in planes parallel with its plane of movement, and a returning-spring for each dog, substantially as described.

47. In a type-writing machine and in an escapement mechanism, the combination of a rack, a holding-dog, and an abrupt stop adapted positively to arrest the rack-teeth when the relative motion (at right angles to the plane of the rack) of the rack and said dog is not sufficient to cause engagement between a rack-tooth and said dog; the construction and arrangement being such that when a rack-tooth is held by said stop the rack-tooth cannot be wedged or cammed back upon the holding-dog, substantially as described.

48. In a type-writing machine and in an escapement mechanism, the combination of a rack, a holding-dog, and a rack-tooth stop having a working face adapted to engage with the working face of the rack-teeth when the relative motion (at right angles to the plane of the rack) of the rack and said dog is not sufficient to cause engagement between a rack-tooth and said dog; substantially as described.

49. In a type-writing machine and in an escapement mechanism, the combination of a rack, a holding-dog, and a shoulder or ledge-like rack-tooth stop at the escape side of the dog and adapted to engage the working face of a tooth of said rack when the relative motion (at right angles to the plane of the rack) of the rack and dog is not sufficient to cause engagement between a rack-tooth and said dog, substantially as described.

50. In a type-writing machine and in an escapement mechanism, the combination of a rack, a holding-dog, and a rack-tooth stop having the plane of its arresting-face parallel or substantially parallel to the face of the holding-dog and adapted to engage the working face of a tooth of said rack when the relative motion (at right angles to the plane of the rack) of the rack and dog is not sufficient to cause engagement between a rack-tooth and said dog, substantially as described.

51. In a type-writing machine and in an escapement mechanism, the combination of a power-driven carriage, a rack, any suitable holding-dog, and a feeding-dog which limits the advance movements of the carriage, said feeding-dog being pivotally mounted upon a carrier and being constructed to move with said carrier transversely of the plane of movement of the rack, and said feeding-dog having at the feeding operation an independent movement solely in the direction of movement of its said carrier, substantially as described.

Signed at the borough of Manhattan, in the city, county, and State of New York, this 16th day of April, A. D. 1898.

DANIEL BRIGGS.
   WILLIAM H. SHEPARD.

Witnesses:
 K. V. DONOVAN,
 ETHEL WELLS.